United States Patent

Indo et al.

[11] Patent Number: 5,537,643
[45] Date of Patent: Jul. 16, 1996

[54] IMAGE FORMING MANAGING APPARATUS FOR SETTING OF COMMUNICATION CONTROL DATA FROM A REMOTE LOCATION ONLY WHEN THE COMMUNICATION CONTROL DATA HAS BEEN INVALIDATED

[75] Inventors: Masaaki Indo, Yokohama; Hiroshi Ozaki, Tokyo, both of Japan

[73] Assignee: Canon Kabushiki Kaisha, Tokyo, Japan

[21] Appl. No.: 925,206

[22] Filed: Aug. 6, 1992

[30] Foreign Application Priority Data

Aug. 9, 1991 [JP] Japan .................... 3-225079

[51] Int. Cl.⁶ .................................... G06F 11/00
[52] U.S. Cl. ............... 395/186; 395/830; 364/285.4; 364/285; 364/DIG. 2; 364/919.5; 364/DIG. 1
[58] Field of Search ............... 364/285.4, 286.4, 364/929, 238.5; 358/404, 403; 379/95; 395/830, 839, 200.1, 186, 187.1, 188.01; 380/4, 3

[56] References Cited

U.S. PATENT DOCUMENTS

| | | | |
|---|---|---|---|
| 3,699,535 | 10/1972 | Klein | 395/800 |
| 4,388,695 | 6/1983 | Heinemann | 395/425 |
| 4,447,887 | 5/1984 | Imazeki et al. | 395/425 |
| 4,649,533 | 3/1987 | Chorley et al. | 370/58 |
| 4,821,107 | 4/1989 | Naito et al. | 358/256 |
| 4,956,852 | 9/1990 | Hodge | 375/8 |
| 4,959,860 | 9/1990 | Watters et al. | 380/4 |
| 4,962,449 | 10/1990 | Schlesinger | 364/200 |
| 5,038,319 | 8/1991 | Carter et al. | 395/200 |
| 5,084,875 | 1/1992 | Weinberger | 364/200 |
| 5,131,025 | 7/1992 | Hamasaki | 379/95 |
| 5,163,088 | 11/1992 | LoCascio | 379/95 |
| 5,163,141 | 11/1992 | Mueller et al. | 395/425 |

*Primary Examiner*—Thomas C. Lee
*Assistant Examiner*—D. Dinh
*Attorney, Agent, or Firm*—Fitzpatrick, Cella, Harper & Scinto

[57] ABSTRACT

A managing apparatus of an image forming apparatus for communicating with a host computer at a remote place comprises: a communicating circuit to communicate with the host computer; a memory to store communication control data which is necessary to communicate with the host computer; and a controller for discriminating whether the communication control data has been stored in the memory or not when a setting command to instruct the setting of the communication control data from the host computer is received, for allowing the setting of the communication control data from the host computer when no communication control data is stored, and for inhibiting the setting of the communication control data from the host computer when the communication control data has been stored.

6 Claims, 10 Drawing Sheets

COPY DEVICE IS UNSET

IMAGE FORMING MANAGING APPARATUS FOR SETTING OF COMMUNICATION CONTROL DATA FROM A REMOTE LOCATION ONLY WHEN THE COMMUNICATION CONTROL DATA HAS BEEN INVALIDATED

BACKGROUND OF THE INVENTION

1. Field of the Invention

The invention relates to a managing apparatus for notifying a state of an image forming apparatus to a remote place.

2. Related Background Art

Hitherto, in a copy device having a function to transmit and receive data for managing the copying operation between the copy device and a host computer at a remote place, communication control data such as network information like a telephone number or the like, check information like a pass word or the like, etc. which are necessary for communication is set by a communication control data setting switch of the copy device or is retained in memory means in the copy device as fixed data which cannot be changed.

In such a copy device, in the case where the data transmission from the copy device to the host computer fails because of a reason such as abnormality of the network, trouble of the host computer, or the like, the data is extinguished without being transmitted to the host computer.

However, as shown in the above conventional copy device, in the case where communication control data is enabled to be easily changed by a switch on the copy device side, there is a problem on security. On the other hand, in the case where the communication control data is fixed, there is a drawback such that a change such as movement of a management base position or the like cannot be performed as necessary.

On the other hand, when the data transmission from the copy device to the host computer fails, for example, even in the case where such data is important data regarding an abnormality of the function of the copy device, the data is extinguished, so that there is a drawback such that it becomes an obstacle for collection or management of data of the host computer. Particularly, since the customer of the copy device considers that the data indicative of the abnormality of the function mentioned above is automatically transmitted to a service base position, there is a drawback such that it is impossible to expect for the customer himself to notify such abnormality data to the service base position and a timing to find out the function abnormality is further delayed.

SUMMARY OF THE INVENTION

It is an object of the invention to provide a managing apparatus which can eliminate the above drawbacks.

Another object of the invention is to provide a managing apparatus in which communication control data can be easily set from a host computer at a remote place, it is prevented that the communication control data is unexpectedly rewritten, and a security is raised.

Still another object of the invention is to provide a managing apparatus in which only when communication control data is not set on the image forming apparatus side, the communication control data is enabled to be set from a host computer at a remote place, and a security is raised.

The above and other objects and features of the present invention will become apparent from the following detailed description and the appended claims with reference to the accompanying drawings.

DETAILED DESCRIPTION OF THE PREFERRED EMBODIMENTS

Figure 1:
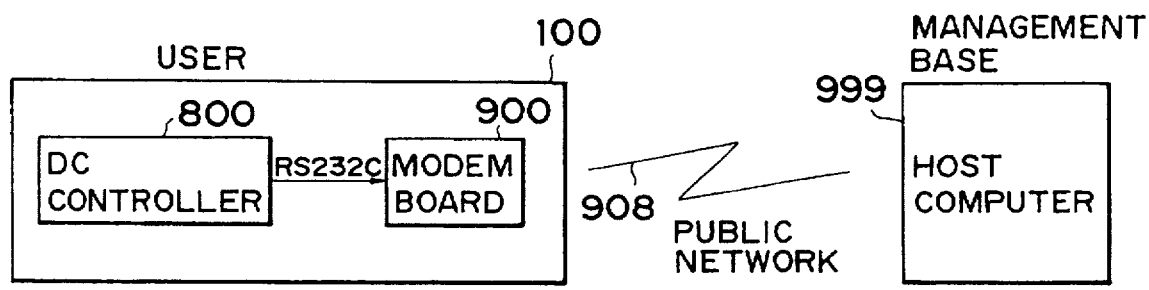
FIG. 1 is a block diagram showing the first embodiment of the invention.

FIG. 1 is a block diagram showing an embodiment of a managing system of a copy device in the invention;

In the embodiment, a copy device 100 and a host computer 999 are connected by a public network 908 as an external communication network. It is assumed that a plurality of copy devices 100 are installed every user.

The host computer 999 is installed at a management base position to manage the copy devices 100.

The copy device 100 has a DC controller 800 to control the copying operation and a modem board 900 as communication control means for transmitting and receiving data between the copy device 100 and the public network 908.

Figure 2:
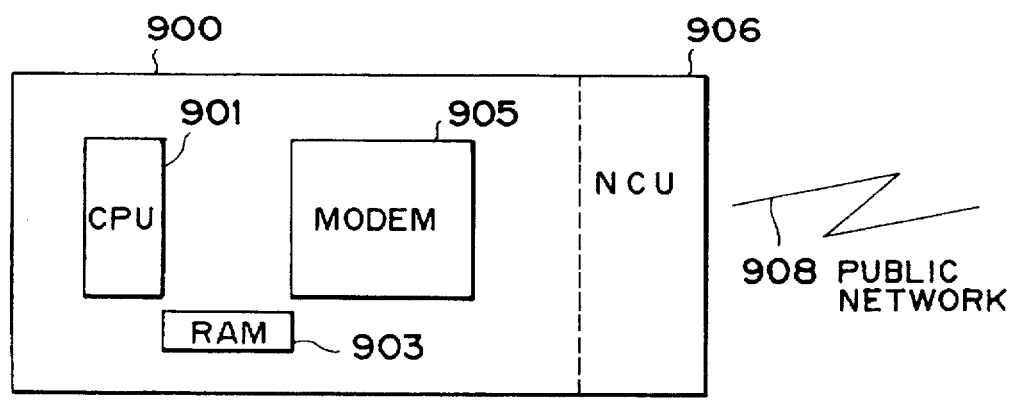
FIG. 2 is a block diagram showing a construction of a modem board in the first embodiment.

FIG. 2 is a block diagram showing a construction of the modem board 900.

The modem board 900 has: a CPU 901 to control the communication; a memory (RAM) 903 to temporarily store communication control data; a modulator/demodulator (modem) 905 for modulating digital communication data to so as to be transmitted through the public network 908 and for demodulating the data transmitted by the public network 908 into the digital communication data; and a network control unit (NCU) 906 to control the connection or the like of the public network 908.

Figure 3:
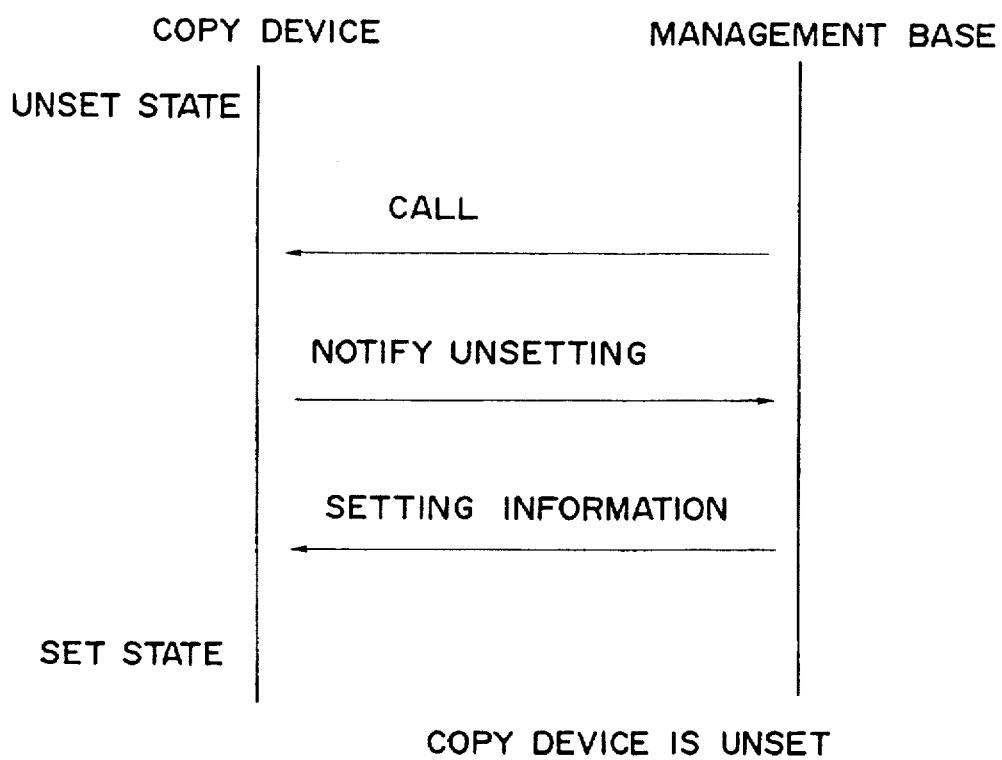
FIG. 3 is a diagram showing a communication sequence in the case where communication control data is unset in the first embodiment.

In the above construction, first, in the case where the host computer 999 at the management base position calls the copy device 100, when the communication control data such as network information, check information, or the like is not set in the modem board 900, the modem board 900 notifies such an unset state to the host computer 999 via the public network 908. When the host computer 999 recognizes such a notification, the host computer sets the communication control data via the public network 908. FIG. 3 is a diagram showing a communication sequence in the above case.

Setting information from the base position includes: a code indicative of the kind of copy device; a pass word to check an illegal access from the outside; and data such as a telephone number or the like for the modem board 900 to call the host computer 999 at the management base position.

Figure 4:
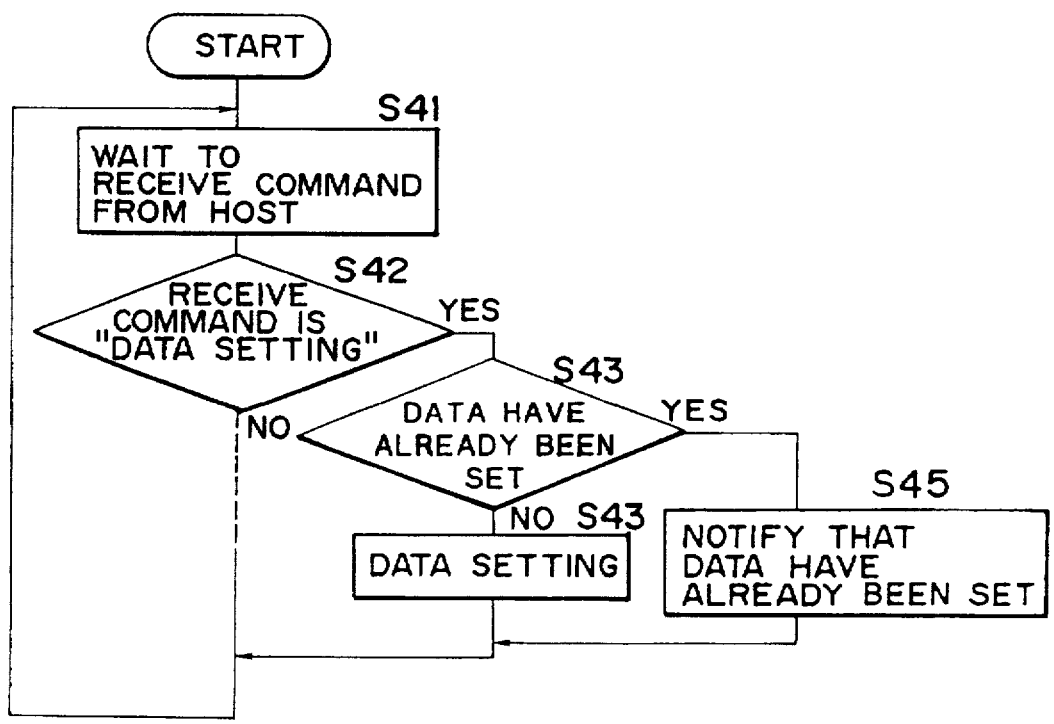
FIG. 4 is a flowchart showing a command receiving process from a host computer in the first embodiment.

FIG. 4 is a flowchart showing the operation of the embodiment.

In the ordinary idling state, the modem board 900 waits for a command from the host computer 999 (step S41). When the command is received from the host computer 999, the modem board 900 discriminates the kind (S42).

When the kind of command indicates "data setting", a check is made to see if data has already been set in the modem board 900 or not (S43). When data is not set, a notification of the data unset state is sent to the host computer 999 and the setting information from the host computer 999 is received and set into the RAM 903 in the modem board 900.

When the data has already been set, the command from the host computer 999 is abandoned as an invalid command and the setting into the RAM 903 is inhibited. That is, the communication control data from the host computer 999 can be set only once.

Figure 5:
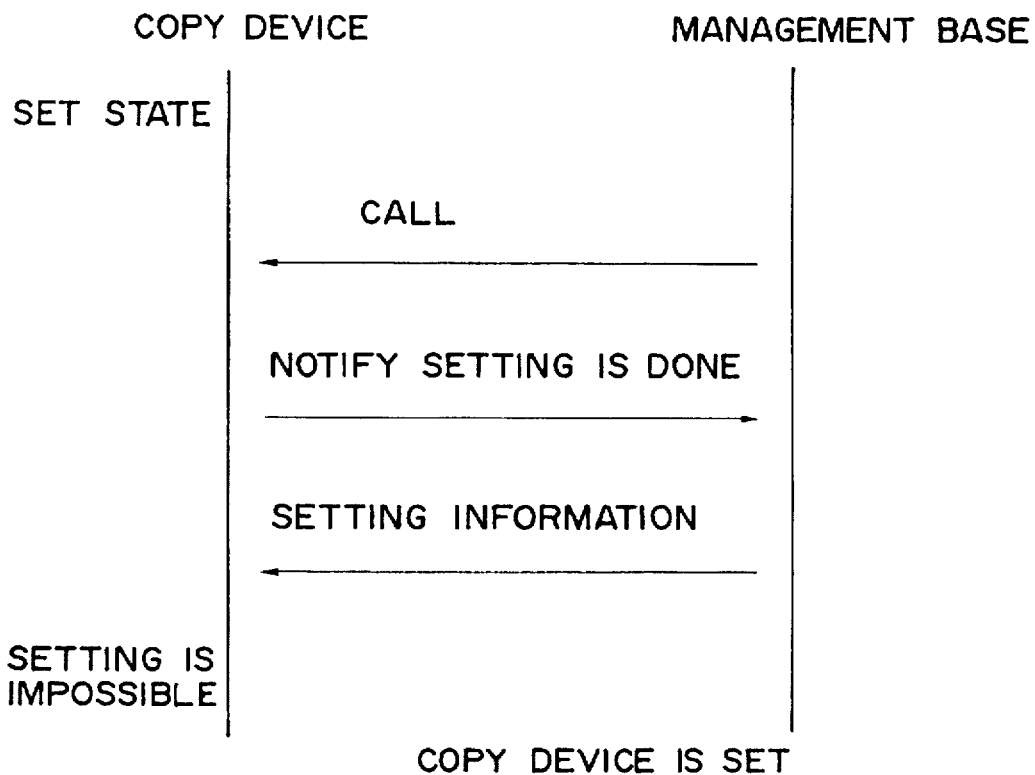
FIG. 5 is a diagram showing a communication sequence in the case where communication control data has been set in the first embodiment.

In this case, the modem board 900 notifies a fact that the data has already been set to the host computer 999 (S45). FIG. 5 is a diagram showing a communication sequence in this case.

In the modem board 900, the data which has once been set can be set into an unset state by initializing means such as a deep switch or the like annexed to the modem board 900. After completion of the initialization, the communication control data can be set again from the host computer 999 in accordance with the sequence shown in FIG. 3.

Figure 6:
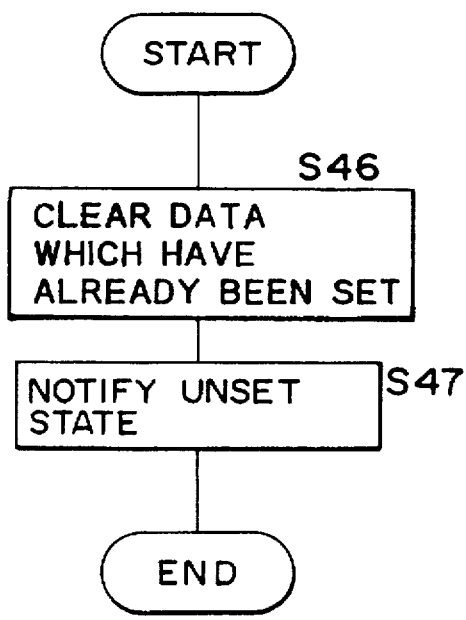
FIG. 6 is a flowchart showing the operation upon initialization of the communication control data in the first embodiment.
Figure 7:
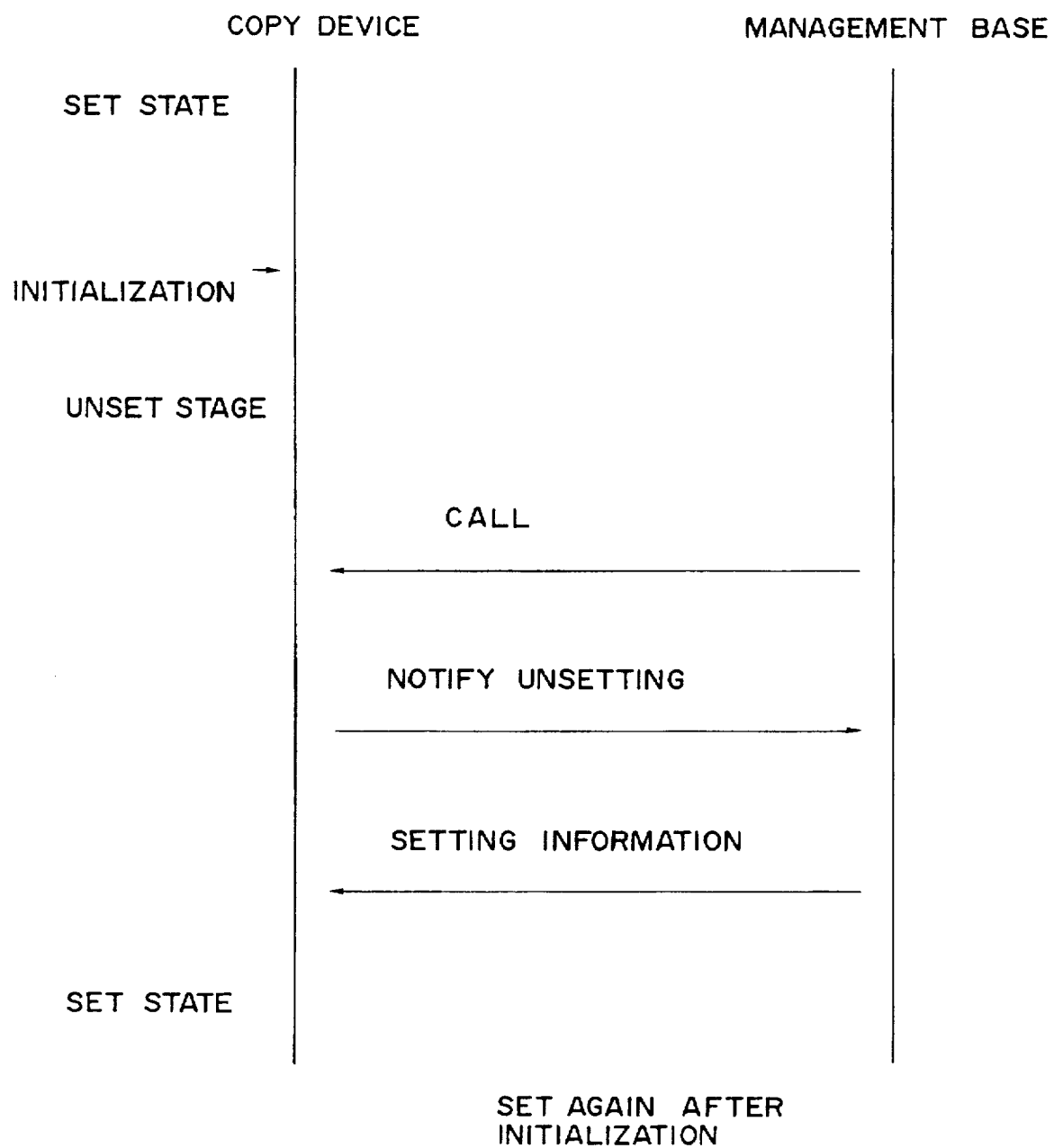
FIG. 7 is a diagram showing a communication sequence in the case where the communication control data is initialized and set again in the first embodiment.

FIG. 6 is a flowchart showing the operation in this case. FIG. 7 is a diagram showing a communication sequence.

First, the data which has already been set in the modem board 900 is cleared by the operation of the above deep switch or the like and is set into the unset state (S46). A fact that the data has been set into the unset state is notified to the host computer 999 (S47). Due to this, the communication control data can be set again from the host computer 999.

According to the embodiment as mentioned above, the network information and check information can be set from the host computer 999 installed at the management base position. After those information were set, they cannot be changed from the outside including the host computer 999, so that there is no problem on security. When the data is initialized on the modem board 900 side, the data can be set again from the host computer 999 side, so that it is possible to also cope with a future change.

In the above embodiment, the data can be again set by the initialization on the copy device 100 side. However, the initializing operation can be also executed from the host computer 999.

In the above copy device management system, the operation in the case where the data transmission from the copy device 100 to the host computer 999 fails due to the occurrence of a function abnormality of the copy device 100 or the like will now be described.

Figure 8:
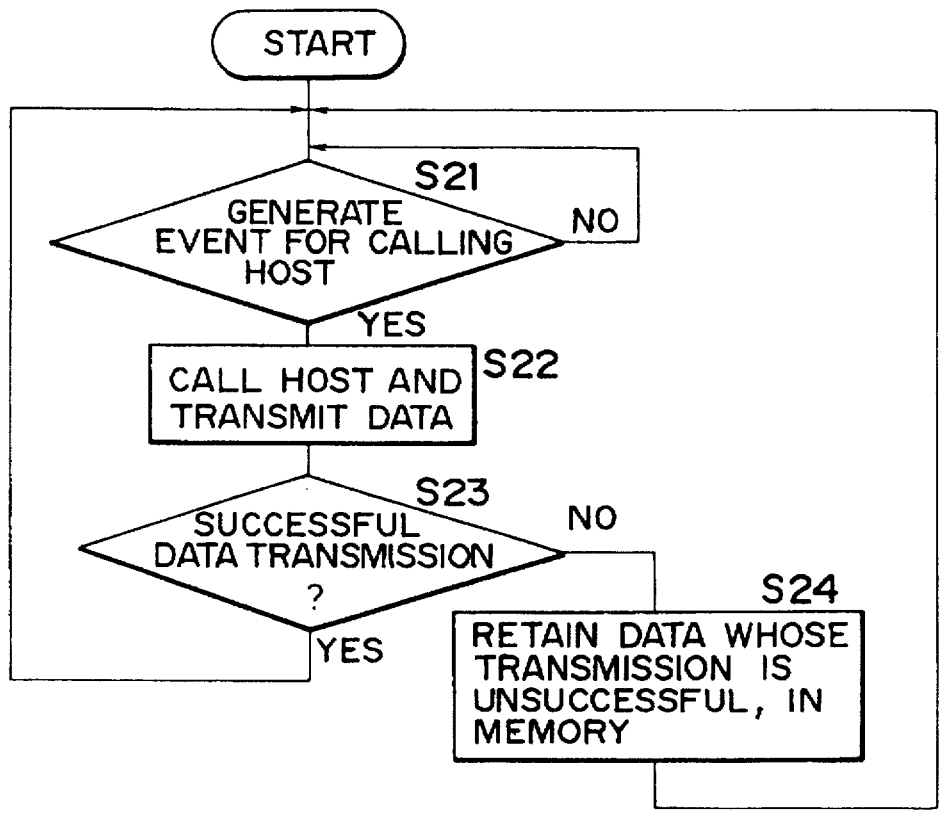
FIG. 8 is a flowchart showing a calling operation in the second embodiment of the invention.

FIG. 8 is a flowchart showing the operation in the case where the copy device 100 calls the host computer 999 and the data is transmitted.

First, when an event to instruct the calling to the host computer 999 is generated in the waiting mode (S21), the host computer 999 is called and the data transmission is tried (S22). When transmission end data is received from the host computer 999, it is determined that the data transmission succeeds (S23) and the processing routine is returned to the waiting mode as it is. When the transmission end data is not received in a predetermined time, it is decided that the data transmission fails. The transmission data is stored into the RAM 903 in the modem board 900 (S24) and the processing routine is returned to the waiting mode. The RAM 903 is backed up by a battery or the like and keeps the data even if a power source is turned off.

Figure 9:
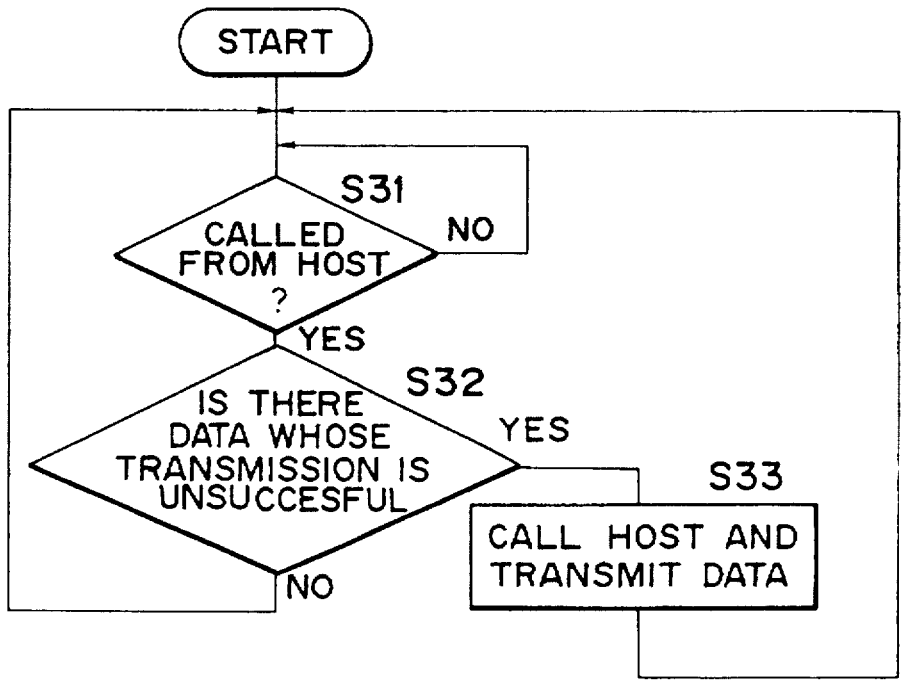
FIG. 9 is a flowchart showing a called operation in the second embodiment.

FIG. 9 is a flowchart showing the operation in the case of transmitting data from the copy device 100 to the host computer 999 by the calling from the host computer 999.

The host computer 999 calls the copy devices 100 of each user at predetermined intervals. When the copy device 100 having the transmission unsuccessful data as mentioned above receives the calling from the host computer 999, such a copy device temporarily disconnects the network for security and newly calls the host computer 999. After the network was connected again, the retransmitting operation of the transmission unsuccessful data is executed.

In FIG. 9, first, when there is a calling from the host computer 999 in the waiting mode (S31), a check is made to see if there is data whose transmission is unsuccessful or not (S32). If YES, after completion of the disconnection of the network, the host computer 999 is called and it is tried to transmit the data (S33). If NO in step S32, the processing routine is returned to the waiting mode.

Figure 10:
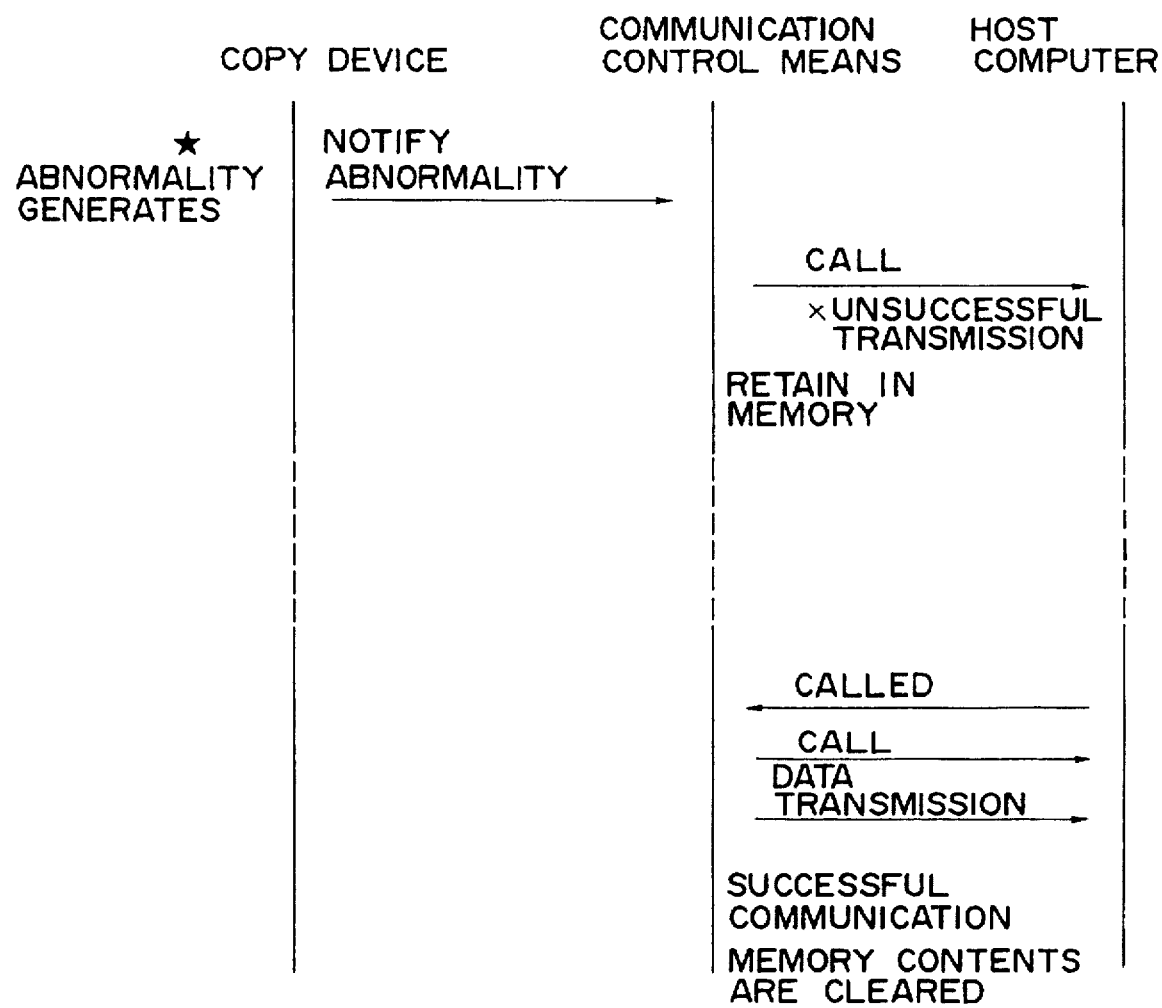
FIG. 10 is a diagram showing a communication sequence in the second embodiment.

FIG. 10 is a diagram showing a communication sequence of the operation when the data transmission fails and the retransmitting operation as mentioned above.

In place of the operation to again transmit the data in accordance with the calling from the host computer 999, the copy device 100 can also automatically call the host computer 999 and can again transmit the data after the elapse of a predetermined time which is measured by a timer (not shown) on the copy device 100 side.

Figure 11:
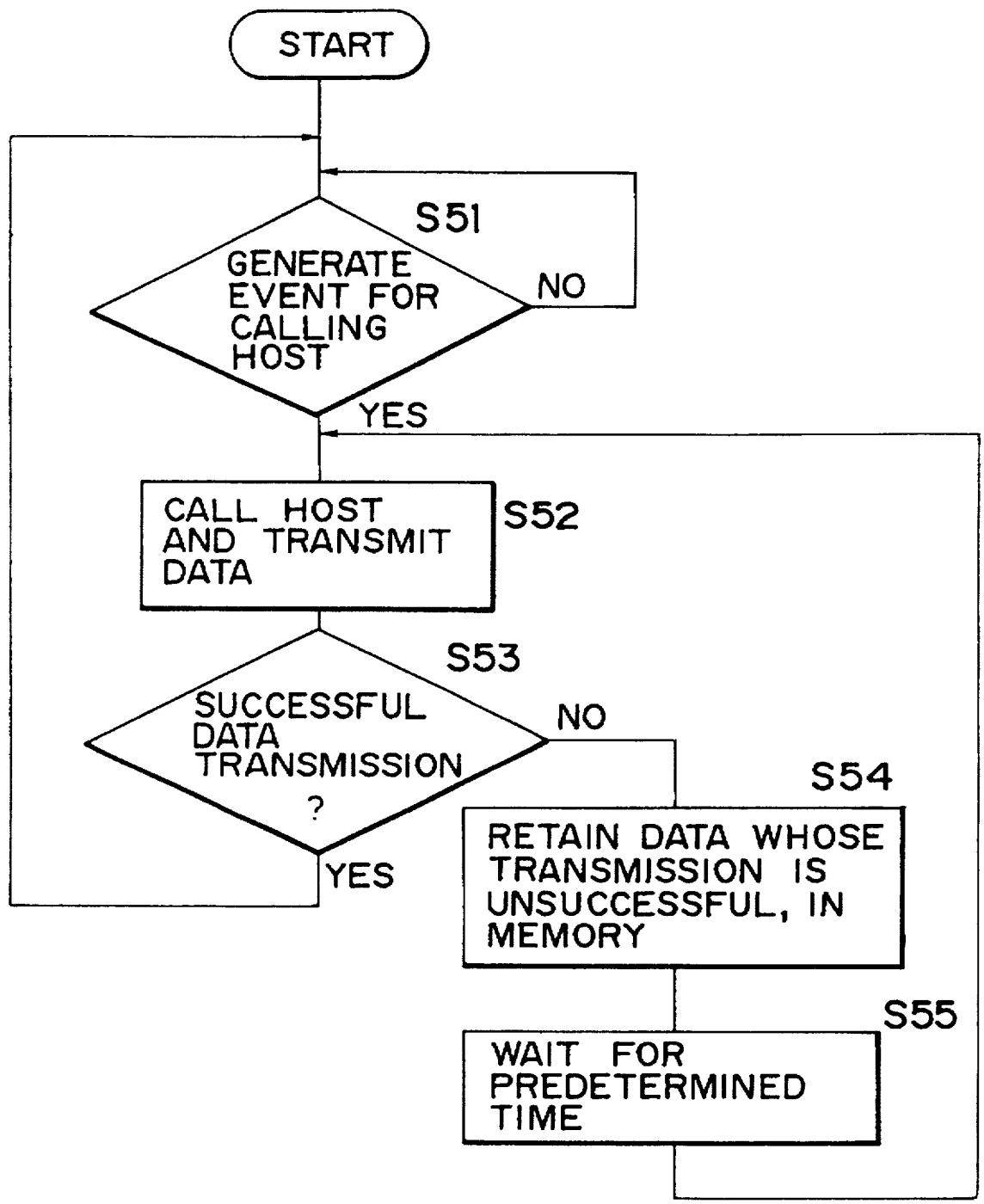
FIG. 11 is a flowchart showing the operation of the third embodiment of the invention.
Figure 12:
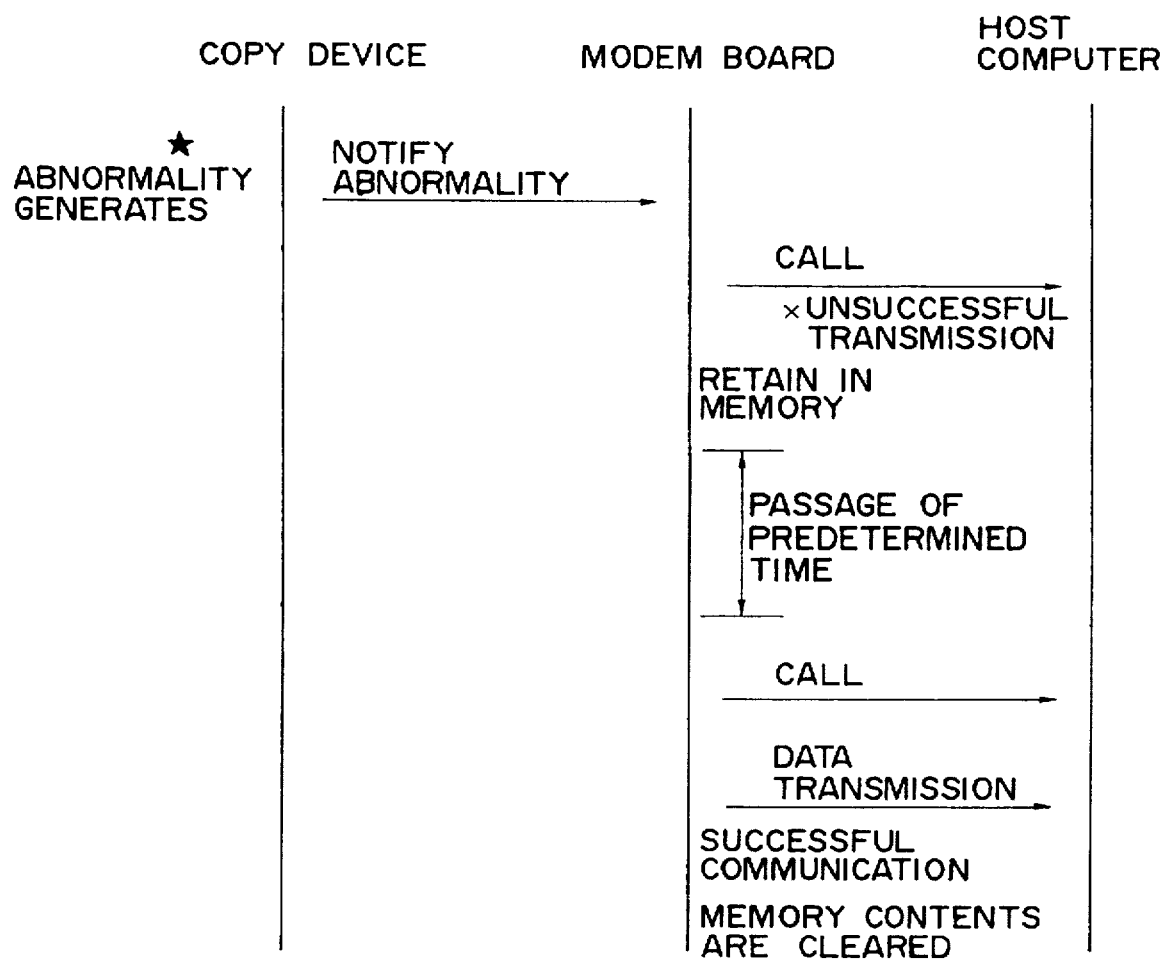
FIG. 12 is a diagram showing a communication sequence in the third embodiment.

FIG. 11 is a flowchart showing the operation in the above case. FIG. 12 is a diagram showing a communication sequence.

First, when an event to instruct the calling to the host computer 999 is generated in the waiting mode (S51), the host computer 999 is called and it is tried to transmit data (S52). When the data transmission succeeds (S53), the processing routine is returned to the waiting mode as it is. When the data transmission fails, the transmission data is stored into the RAM 903 in the modem board 900 (S54) and the apparatus waits for a predetermined time (S55). After completion of the waiting, the processing routine is returned to step S52 and the data whose transmission is unsuccessful is transmitted again.

When the data transmission is unsuccessful as mentioned above, a message indicative of the unsuccessful data transmission can be displayed on an LCD (liquid crystal display;

not shown) provided for the copy device 100 and it is also possible to instruct the user to call a telephone to the service base position.

Figure 13:
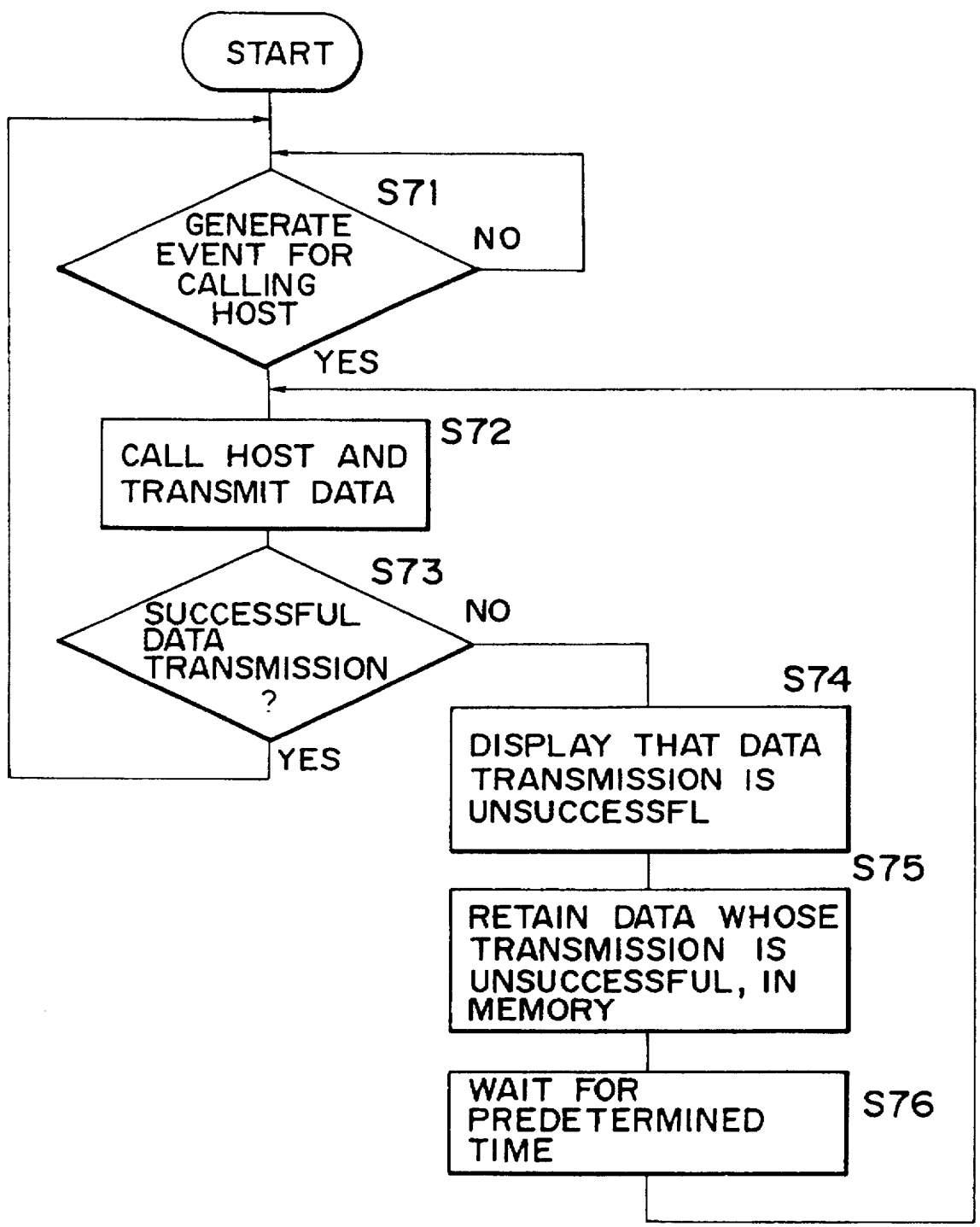
FIG. 13 is a flowchart showing the operation of the fourth embodiment of the invention.
Figure 14:
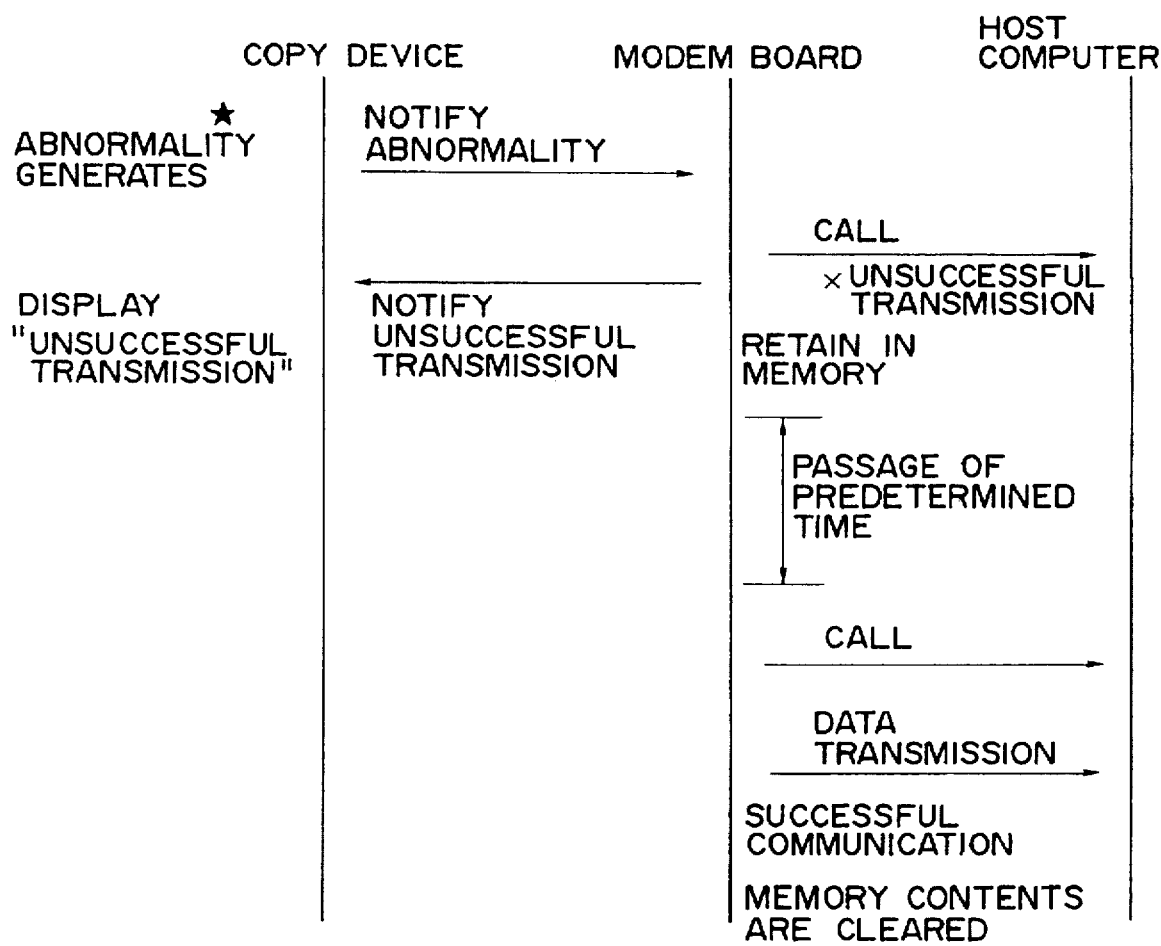
FIG. 14 is a diagram showing a communication sequence in the fourth embodiment.

FIG. 13 is a flowchart showing the operation in the above case. FIG. 14 is a diagram showing a communication sequence.

First, when an event to instruct the calling to the host computer 999 is generated in the waiting mode (S71), the host computer 999 is called and it is tried to transmit data (S72). When the data transmission succeeds (S73), the processing routine is returned to the waiting mode as it is. When the data transmission fails, a message indicative of the unsuccessful data transmission is displayed on the LCD (S74), thereby instructing the user to call a telephone to the service base position. In a manner similar to the case described in FIG. 11, the data whose transmission is unsuccessful is stored into the RAM 903 in the model board 900 (S75). The apparatus waits for a predetermined time (S76). After the waiting mode was cancelled, the processing routine is returned to step S72 and the data whose transmission is unsuccessful is again transmitted.

As mentioned above, by instructing the user to notify the unsuccessful data transmission to the service base position, an effective management can be assured on the service base position side for an abnormality of each copy device 100.

The present invention is not limited to the foregoing embodiments but many modifications and variations are possible within the spirit and scope of the appended claims of the invention.

What is claimed is:

1. A managing apparatus of an image forming apparatus for communicating with a host computer at a remote location, comprising:

memory means for storing communication control data which is necessary to communicate with the host computer, the communication control data including a number for calling the host computer by the managing apparatus and a password for confirming whether a communication is possible or not;

communicating means for communicating data representing a state of the image forming apparatus and the communication control data to be stored in said memory means with the host computer; and control means, connected to said memory means and to said communicating means, for discriminating, at a time when the control means receives a setting command from the host computer to instruct the setting of the communication control data, whether the communication control data has been stored in said memory means, for transmitting, to the host computer, data indicating that the communication control data is settable and allowing the setting of the communication control data from the host computer when no communication control data has been stored in the memory means, and for transmitting, to the host computer, data indicating that the communication control data is not settable and inhibiting the setting of the communication control data from the host computer when the communication control data has been stored in the memory means for the purpose of security, wherein said control means controls the communication with the host computer according to the communication control data stored in said memory means and controls calling the host computer.

2. A managing apparatus according to claim 1, further having input means for inputting an instruction to invalidate the communication control data stored in said memory means, and wherein said control means enables the communication control data to be set from the host computer when there is an instruction input from said input means.

3. A managing apparatus according to claim 1, wherein said control means transmits a discrimination result, indicating whether or not the communication control data has been stored in the memory means, to the host computer by said communicating means.

4. A managing apparatus of an image forming apparatus for communicating with a host computer at a remote location, comprising:

memory means for storing communication control data which is necessary no communicate with the host computer, the communication control data which is transmitted from the host computer, including a number for calling the host computer by the managing apparatus and a password for confirming whether a communication is possible or not;

communicating means for communicating data representing a state of the image forming apparatus and the communication control data to be stored in said memory means with the host computer;

initializing means for invalidating the communication control data stored in said memory means in response to an input from an operator; and control means, connected to said memory means and to said communicating means, for transmitting to the host computer, data indicating that the communication control data is settable after said initializing means has invalidated the communication control data stored in said memory means and allowing the communication control data which is transmitted from the host computer to be stored in said memory means only once for purpose of security;

wherein said control means controls the communication with the host computer according to the communication control data stored in said memory means and controls calling the host computer.

5. A method of controlling a communication between a managing apparatus of an image forming apparatus and a host computer at a remote location, the managing apparatus having a memory for storing communication control data including a number for calling the host computer and a password for confirming whether the communication is possible or not, said method comprising the steps of:

a) transmitting a command for setting of the communication control data to the managing apparatus by the host computer;

b) discriminating whether or not the communication control data has been stored in the memory after the managing apparatus receives the command;

c) transmitting, to the host computer, data indicating that the communication control data is settable and allowing by the managing apparatus to store the communication control data from the host computer when no communication control data has been stored in the memory, and transmitting, to the host computer, data indicating that the communication control data is not settable and inhibiting by the managing apparatus to store the communication control data from the host computer when the communication control data has been stored in the memory for purpose of security; and d) controlling by the managing apparatus the communication with the host computer according to the communication control data stored in the memory and controlling calling of the host computer.

6. A method of controlling a communication between a managing apparatus of an image forming apparatus and a host computer at a remote location, the managing apparatus having a memory for storing communication control data including a number for calling the host computer and a password for confirming whether the communication is possible or not and initializing means for initializing the communication control data stored in the memory, said method comprising the steps of:

invalidating by the initializing means communication control data stored in the memory;

transmitting, to the host computer, data indicating that the communication control data is settable;

transmitting the communication control data to the managing apparatus from the host computer;

allowing by control means to store the communication control data from the host computer in the memory only once for the purpose of security; and controlling the communication with the host computer according to the communicating control data stored in the memory and controlling calling of the host computer.

* * * * *

UNITED STATES PATENT AND TRADEMARK OFFICE
CERTIFICATE OF CORRECTION

PATENT NO. : 5,537,643
DATED      : July 16, 1996
INVENTOR(S): MASAAKI INOO, ET AL.

It is certified that error appears in the above-identified patent and that said Letters Patent is hereby corrected as shown below:

ON TITLE PAGE

AT [19] UNITED STATES PATENT,
"Indo et al." should read --Inoo et al.--.

AT [75] INVENTORS,
"MASAAKI INDO" should read --MASAAKI INOO--.

COLUMN 6

Line 14, "no" should read --to--.
Line 36, "purpose" should read --the purpose--.
Line 64, "for" should read --for the--.

Signed and Sealed this

Twenty-seventh Day of May, 1997

Attest:

BRUCE LEHMAN

Attesting Officer    Commissioner of Patents and Trademarks